July 29, 1969 P. J. BETTEGA 3,458,006
MECHANICAL STEERING ASSIST UNIT
Filed Sept. 8, 1967 3 Sheets-Sheet 1

INVENTOR.
PATRICK J. BETTEGA.
BY
Russel C. Wells
ATTORNEY.

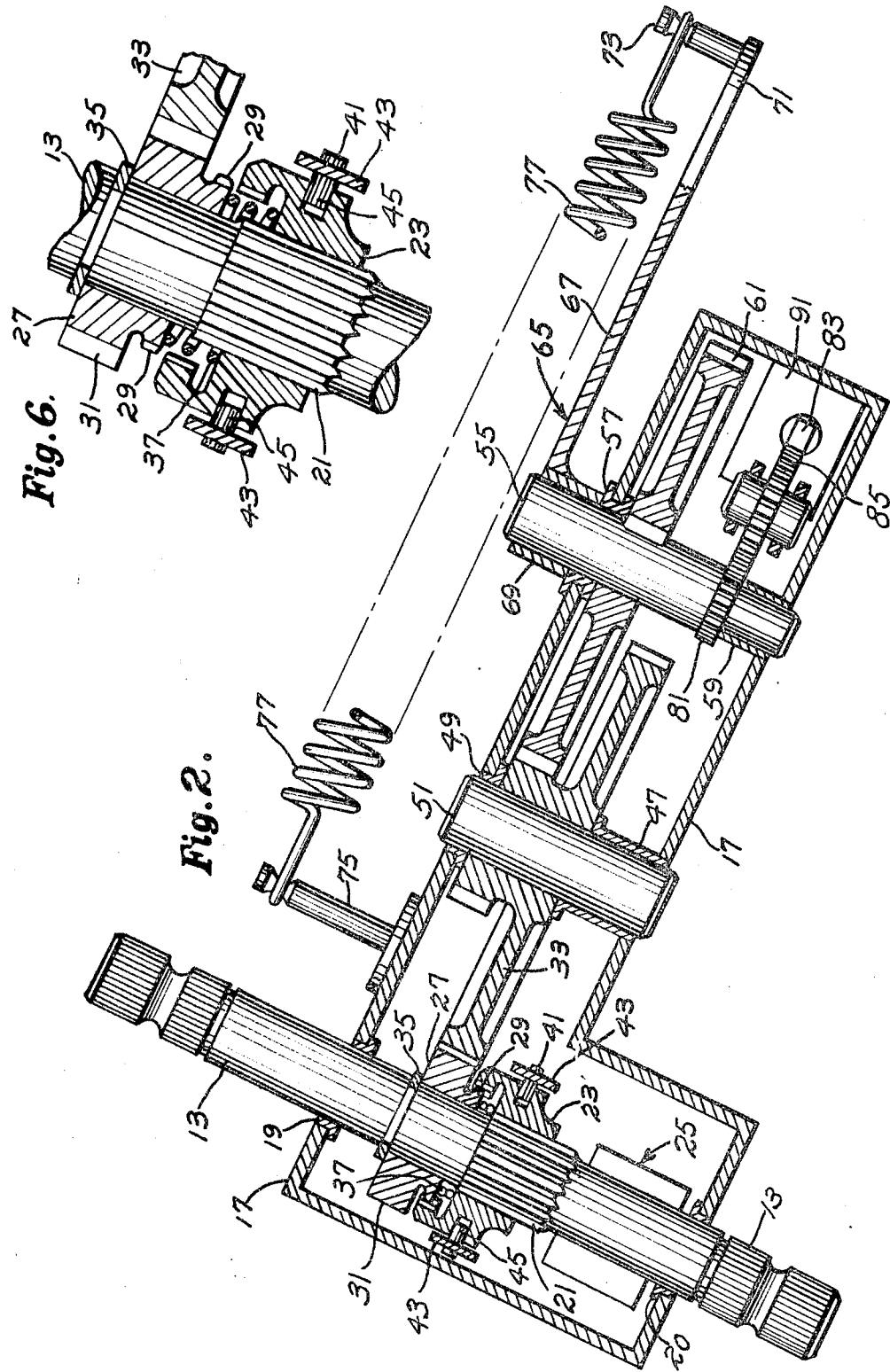

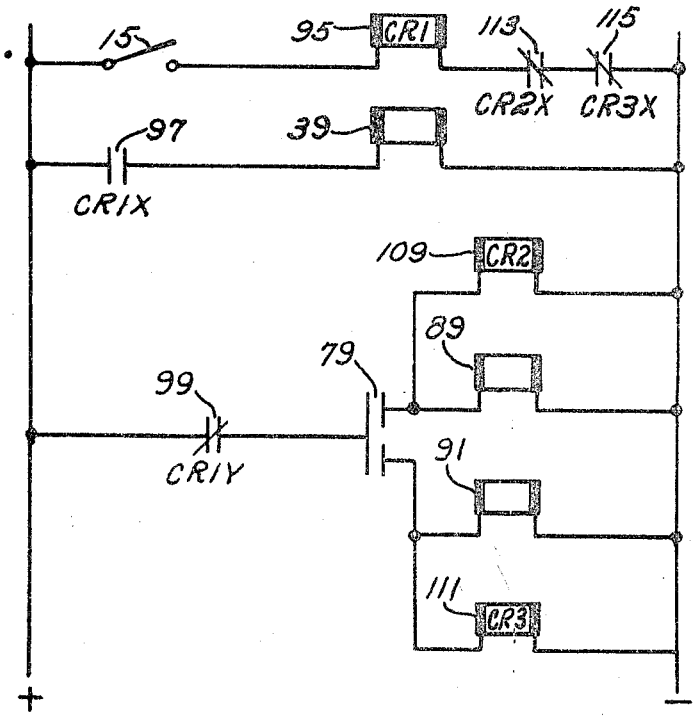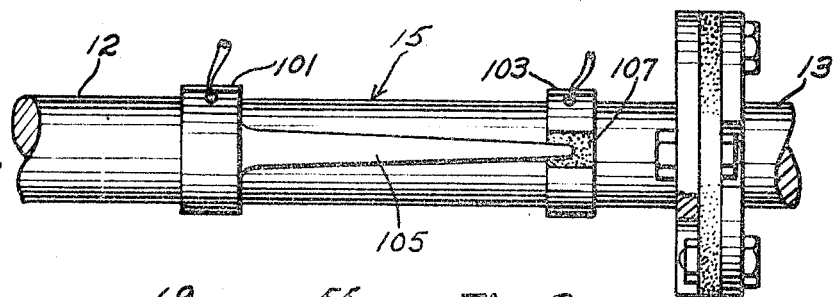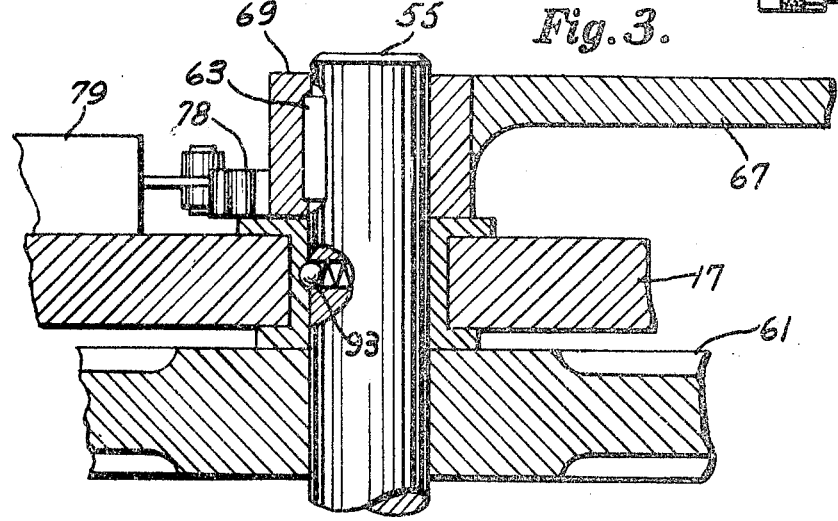

United States Patent Office 3,458,006
Patented July 29, 1969

3,458,006
MECHANICAL STEERING ASSIST UNIT
Patrick J. Bettega, 4421 4th St., Wayne, Mich. 48184
Filed Sept. 8, 1967, Ser. No. 666,347
Int. Cl. B62d 5/02
U.S. Cl. 180—79.3      10 Claims

ABSTRACT OF THE DISCLOSURE

A vehicle steering assist unit utilizing a basically mechanical construction throughout. The unit can be mounted separately on the steering shaft or it can be incorporated with the steering gear assembly. The unit provides means for altering the amount of torque to be applied by the operator to the steering assembly before the unit supplies torque assistance. The disclosed embodiment provides for a gear train to provide a desired mechanical advantage while retaining a convenient size.

BACKGROUND OF THE INVENTION

Prior art devices of this class have been hydraulic or electrical in nature. The primary type in present use is of the hydraulic type. In these devices, when there is an engine failure, the prime mover for the hydraulic system is disabled rendering the vehicle operator without steering control. The present unit is so constructed that if there is an engine failure, the operator will not lose steering control but will have complete control of the vehicle.

The primary object of the invention is to have a power steering assist unit which will at all times and under all conditions give to the vehicle operator complete steering control.

Another object is to provide a steering assist unit which is capable of being varied as to the amount of torque to be applied by the operator before having the power assist to be developed.

DESCRIPTION OF THE FIGURES

Other objects, features and advantages of the invention will appear in the following descirpition and appended claims read in connection with the accompanying drawings in which is illustrated an exemplary form of power assist unit embodying the present invention, this being indicative of but one of the various ways in which the principle of the invention may be employed.

FIGURE 2 is an elevation view partly in section, taken along the line 2—2 in FIGURE 1;

FIGURE 3 is an enlarged section view of the lever and switch assembly taken along line 3—3 in FIGURE 1;

FIGURE 4 is a plan view of a torque switch used in the present invention;

FIGURE 5 is a schematic;

FIGURE 6 is an enlarged view of the ring gear and spline assembly disengaged.

DETAILED DESCRIPTION

Figure 1:
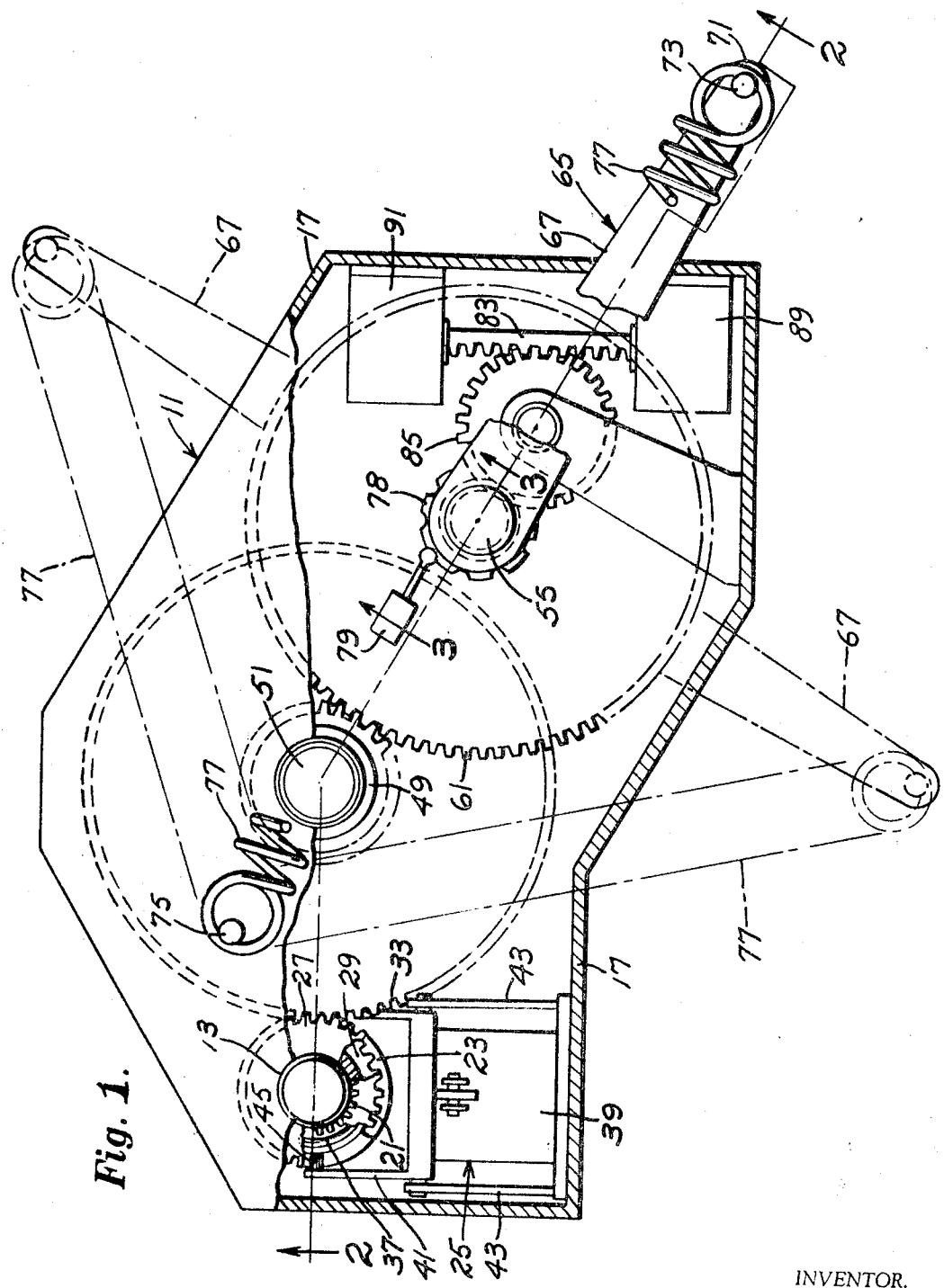
FIGURE 1 is is a plan view of the power assist unit showing the extremes of the lever arm assembly.

Referring to the figures and characters of reference, there is shown a steering shaft assembly including a steering wheel and the mechanical steering power assist unit 11. The mechanical steering power assist unit 11 is coupled to and aligned with a steering shaft 12 assembly by a pair of flexible rag couplings which are not shown. The opposite end of the power assist unit provides the input to the steering gear unit for effecting the desired directional control of the motor vehicle.

The steering wheel is fixedly attached to one end of the steering shaft 12 so that in effect both the shaft 12 and the steering wheel rotate as a single unit. At the end of the steering shaft 12 opposite that of the steering wheel, the shaft 12 is coupled to the steering gear unit shaft 13 through a flexible rag coupling.

Mounted along the steering wheel shaft 12 there is a torgue sensing switch 15 which senses the amount of twist torsion in the steering shaft 12 when the steering wheel is initially turned and the steered wheels have not turned. This is an electrical sensing unit which sends the derived signals to the power assist unit 11 in a manner which will be hereinafter described.

As hereinafter mentioned, the shaft 13 extends through a housing 17 containing the power assist unit 11. The shaft 13 is supported by a pair of bearings 19 and 20, one in each wall of the housing 17. Intermediate the ends of the shaft 13 and within the housing 17, the shaft 13 has a splined section 21. A ring gear 23 is slideably mounted on the splines of the shaft 13. The ring gear 23 moves longitudinally along the shaft under control of a solenoid actuator unit 25. Rotatably mounted on the shaft 13 and in juxtaposition to the ring gear 23 is a dual-faced pinion 27. One face 29 of the pinion meshes with the ring gear 23 and the second face 31 meshes with a first spur gear 33. The pinion 27 is contained on the shaft 13 by means of a snap ring 35 mounted on the shaft. A compression spring 37 is interposed between the dual-faced pinion 27 and the ring gear 23 acting to keep the pinion and ring gear apart.

The solenoid actuator unit 25 comprises a solenoid 39 which is mounted to the housing 17. Connected to the armature of the solenoid is a yoke member 41 which is pivotally mounted between a pair of supports 43. The supports are fixedly attached to the housing 17. The spread portion or arms of the yoke member 41 ride in a circumferential groove 45 on the body of the ring gear 23. When the solenoid 39 is deactuated, the compression spring 37 keeps the ring gear 23 and the first face 29 of the pinion 27 out of mesh; this also moves the armature of the solenoid in a direction out of the core. When the solenoid 39 is actuated, the magnetic force of the solenoid overcomes the force of the compression spring 37 and the ring gear 23 is driven into mesh with the first face 29 of the pinion 27. When the armature moves, the yoke member 41 pivots abouts its supports 43.

Mounted in the housing 17 by a second pair of bearings 47 and 49 and parallel to the previously mentioned shaft 13, is a first stub shaft 51. Mounted on this stub shaft 51 is the intermediate dual spur gear 33. This gear 33 is rotatably mounted on the shaft 51. The gear 33 is a dual spur gear having a larger diameter gear meshing with the pinion 27 and a smaller diameter gear providing means for transmitting torque to a subsequent spur gear unit 61. The two bearings 47 and 49 also provide means for supporting and locating the spur gear 33 on the shaft 51, keeping it in full mesh with the pinion 27 and the spur gear unit 61.

A second stub shaft 55, mounted in the housing 17, is parallel to and displaced from the first stub shaft 51. In a similar manner as the first stub shaft 51, it is supported in the housing 17 by a pair of bearings 57 and 59. Unlike the first shaft 51, this second stub shaft 55 extends beyond the housing 17 a substantial distance. Keyed to this shaft 55, and within the housing 17, is a single-faced spur gear 61 which is in mesh with the smaller diameter gear face on the first stub shaft 51.

Fixedly mounted to the outwardly extending portion of the second stub shaft 55 by suitable means, such as a key 63, is a lever assembly 65. The elongated lever 67 extends from a hub 69, which is around the shaft 55, in a direction substantially normal to the axis of the shaft. At the free end 71 of the lever 67, opposite the fixed end at the hub 69 and extending normal to the plane of the lever, is a first spring stud 73. This first spring stud 73 is fixedly attached to the lever 67.

A second spring stud 75 is mounted on the housing 17 and extends outwardly therefrom in a direction parallel to the first spring stud 73. This second spring stud in the preferred embodiment is mounted along a line which passes through the centers of the two stub shafts 51 and 55, although this is not a limitation of the invention. A variable rate coiled tension spring 77 is attached between the two spring studs 73 and 75.

In FIGURE 1, the spring 77 is shown in its neutral position having its longitudinal axis passing over the center of the two stub shafts 51 and 55. In this position, the spring 77 does not attempt to rotate the lever 67 about its axis. Also in FIGURE 1, there is shown the second spring stud 75 mounted on the housing 17 in such a manner that when the spring is in its neutral position, the centers of the two stub shafts 51 and 55 are between the spring studs.

Shown in FIGURE 3 mounted on the housing 17 is a switch actuating mechanism in the form of a Geneva drive 78 and a toggle switch 79. The Geneva drive 78 is operatively coupled to the hub of the lever assembly 65. The toggle switch 79 is spaced away from the lever assembly 65, but it is operatively coupled to the Geneva drive 78. As the lever assembly 65 rotates about the shaft 55, the Geneva drive moves the actuator of the toggle switch 79 causing the switch to transfer from a neutral to an actuated position.

Mounted within the housing 17 and on the end of the second stub shaft 55 opposite the lever assembly 65, is another pinion 81 for meshing with a rack 83 and wheel 85 unit. The wheel 85 is mounted on a shaft 87 which is parallel to the stub shafts 51 and 55. The rack 83, which meshes with the wheel 85, is supported between a pair of opposed solenoids 89 and 91. These solenoids 89 and 91 are mounted to the housing 17 by any suitable means. These solenoids 89 and 91, in combination with the rack 83 and the wheel 85, function to return the lever assembly 65 to its neutral or home position.

The second stub shaft 55 is detented in the housing by a ball detent 93. The detented position corresponds to the neutral or home position of the lever assembly 65. Under conditions which will be subsequently described, the rack 83 and wheel 85 unit returns the lever assembly 65 to the neutral position as determined by the detent 93.

Thus has been described the location and the cooperation of the several parts of the mechanical power assist unit in the preferred embodiments as shown by the figures. Several deviations can be made in the location of the various parts without departing from the spirit of the invention; and, therefore, it is to be understood that the foregoing is by way of illustration and not limitation. The first stub shaft 51 and its associated gears 33 and bushings 47 and 49 provide a means for achieving a desired mechanical advantage for transmitting the amount of rotation of the lever assembly to the pinion 27. If the size of the unit is not a consideration, then this first stub shaft could be eliminated and a direct coupling could be made from the second stub shaft through its spur gear to the pinion of the shaft 13. Also, this unit could be combined with the steering gear assembly and form an integral steering gear and power assist unit.

OPERATION

As the title depicts, this is a mechanical steering assist unit which provides a power assist to the rotation of the steering shaft when it is rotated by the force applied to the steering wheel. The figures of reference show a part-time assist unit. That is, this unit does not operate until a given amount of torque is applied to the steering shaft. This amount of torque is sensed by the torque sensing switch 15 shown in FIGURE 4. The circuit to the solenoid 39 is closed and electrical power is applied to the solenoid. The amount of torque can be any desired value, and for the purposes of illustration, I have used a torque value of 1 pound foot.

Consider driving a vehicle equipped with the preferred embodiment as shown and described herein. Directing a vehicle along a straight path does not require any appreciable turning of the steering wheel to maintain the desired direction. In such a situation, the torque applied to the steering shaft is below the indicated minimum of the preceding paragraph of 1 pound foot. The power assist unit 11 is, therefore, inoperative and the dual-faced pinion 27 is not rotating on the shaft 13. The lever assembly 65 is in its detented position as shown in FIGURE 1.

When a situation arises wherein the operator must apply a torque to the steering wheel to turn the vehicle and this applied torque exceeds a value of 1 pound foot, the switch 15 is transferred to complete the circuit to the relay 95. The relay contacts 97 close completing the circuit to the solenoid 39. A second set of relay contacts 99 open to remove any voltage to the return solenoid circuit. The solenoid 39 is energized to pull the armature into the core. This causes the yoke member 41 to pivot about its supports 43 sliding the ring gear 23 toward the dual-faced pinion 27. The shaft section in this area being splined allows the ring gear to travel axially along the shaft 13 but prohibits it from rotating freely about the shaft 13. When the ring gear unit slides toward the dual-faced pinion 27, the compression spring 37 opposes its travel. One face 29 of the dual-faced pinion 27, the face nearest the ring gear 23, comes into mesh with the ring gear 23. This meshing of gears causes the dual-faced pinion 27 to follow the rotation of the ring gear 23 and the shaft 13.

As the pinion rotates, and for the purposes of illustration I will describe a clockwise rotation by the steering wheel; the intermediate dual-face spur gear 33 is rotated in the opposite or counterclockwise direction. This gear 33 drives the single-face spur gear 61 in a clockwise rotation. Since this gear 61 is keyed to the second stub shaft 55, the shaft and all of the parts connected thereto also rotate in a clockwise direction. The lever assembly 65 is rotated out of its detented position. Thus far only the torque applied to the steering shaft by the driver of the vehicle has been considered. This is so in a unit which is basically a part-time power assist unit; namely, a unit which is not operative until a predetermined amount of torque is applied to the steering shaft 12.

Referring to FIGURE 4, there is shown in detail the construction of the torque sensing switch 15 mounted on the steering shaft 12. The switch comprises two sleeves or rings 101 and 103. These sleeves 101 and 103 are spaced apart along the shaft 12 and are on the shaft fitted so as to rotate with the shaft 12. Extending from the sleeve 101 to the second sleeve 103 is a contact arm 105. The arm 105 is fixedly attached to the first sleeve 101 and slidably mounted in the second sleeve 103.

The second sleeve 103 is divided into two circumferential sections: the first section is an insulated section 107 and the remainder or second section is an electrical conducting section. The insulated section 107 is positioned so as to allow the contact arm 105 to be in contact therewith when no torque is applied to the steering wheel. The size of the insulated section determines the allowable torque to be applied by the operator before the power assist unit is operable. For example, if it is desired to have a full-time power assist unit, then as an example, the size of the conducting section would be maximum and the size of the insulating section 107 would be zero. Since the vehicle must operate both in a clockwise and a counterclockwise direction, the insulated portion 107 must be symmetrical about the neutral axis. The spacing between the two sleeves 101 and 103 determines the torque sensitivity of the switch with the greater spacing allowing for more sensitivity.

As the lever assembly 65 rotates about the second stub shaft 55, the spring 77 decreases its length and thereby applies more force fully on the lever 67. This force assists the lever to rotate in a clockwise direction. As the spring 77 pulls on the lever 67, this causes the second stub shaft 55 to be rotated more fully or harder in the clockwise direction. This harder rotation is an assist to the turning of the steering wheel. Thus as the steering wheel 12 is rotated by the operator in a clockwise direction, with a torque greater than 1 pound foot, the lever assembly 65 is urged by the application of the spring rate of the spring 77 to rotate in the same direction. Tracing back through the mechanism, the torque supplied by the spring 77 is transmitted to the steering shaft through the dual-faced pinion 27 and the ring gear 23. Thus, the steering shaft is aided in its rotation by the spring 77 and the lever assembly 65.

The basic equation for the application of torque is:

$$T = FD$$

where

T = pound feet
F = force in pounds
D = distance in feet

Applying the equation to the present invention and substituting the factors of the present invention into the equation as follows:

F = the spring rate of the spring
D = the perpendicular distance from the axis of the spring to the pivot point of the lever Therefore, as the length of the spring 77 decreases, the perpendicular distance from the axis of the spring to the pivot point of the lever 67 increases. This increasing length applies more torque to assist the operator in turning the wheel in the direction indicated.

When the operator has completed the turn, and starts to restore the steering wheel to its neutral position, the torque sensing switch 15 passes through a zero or minimum torque point corresponding to section 107, which causes the relay 95 to de-energize. The relay contacts 97 open to disengage the solenoid 39 and the other relay contacts 99 close to complete the circuit to the particular return solenoid 91. The toggle switch has been previously switched by the rotation of the lever assembly 65 to select which of the solenoids to be energized to return the lever 67.

As shown in the schematic diagram of FIGURE 5, when the assist unit is being restored to its home position, either of the two return solenoids 89 and 91 and their corresponding return relays 109 and 111 is energized. Normally closed contacts 113 and 115 of each of these relays are placed in series with the torque sensing realy as an interlock to prevent the relay from energizing while the return solenoids are energized.

In the foregoing description of the operation of the preferred embodiment of the invention, mention is made of the detented position of the lever assembly 65 as the neutral or home position. In relating these terms to vehicle direction, the neutral or home position corresponds to the movement of the vehicle in a straight line direction while the extreme positions of lever 67, shown in phantom lines in FIGURE 1, are the maximum left and right turn positions.

What is claimed is:

1. A mechanical steering assist mechanism comprising:
   a steering shaft having a steering wheel at one end and operatively connected to the steering gear at the other end,
   a pinion fixedly mounted on said steering shaft,
   a shaft parallel to and displaced from said steering shaft,
   a gear fixedly mounted to said shaft and in engagement with said pinion,
   a lever fixedly attached at one end to said shaft, its free end extending away from said shaft in a direction normal to the axis of said shaft, and
   a spring attached to the free end of said lever and extending along said lever to a point diametrically opposite the free end, said spring acting to aid the rotation of the steering shaft in the direction of rotation of the steering wheel.

2. A mechanical steering assist mechanism comprising:
   a steering shaft,
   sensing means connected to said shaft for sensing the amount of twist of said steering shaft,
   a pinion rotatively mounted on said shaft,
   a solenoid,
   a ring gear slideable mounted on said shaft, said ring gear operatively connected to said solenoid for selectively engaging with said pinion,
   a shaft displaced from said steering shaft, said shaft having a detented position,
   gear means fixedly attached to said shaft and engaged with said pinion,
   a lever connected at one end to said shaft and extending away from said shaft, and
   resilient means connected to the free end of said lever and extending in a direction away from said lever so as to apply force to said lever when said lever is not in its detented position, said force acting to rotate said gear means to assist in the rotation of said steering shaft.

3. The mechanism according to claim 2 wherein the sensing means comprises:
   a pair of spaced apart sleeves encircling said steering shaft, each sleeve in a press fit relationship to said steering shaft and rotating relatively one to the other in response to the twist of said steering shaft,
   a contact arm fixedly mounted to the first of said sleeves, and extending to and in slideable contact with the second of said sleeves,
   said second sleeve having an insulated portion and a conducting portion, said insulating portion operatively aligned with the detented position of said shaft and said conductive portion indicating the amount of twist of said steering shaft.

4. A mechanical steering assist mechanism for motor vehicles interposed between the steering wheel and the steering gear, said mechanism comprising:
   a first shaft operatively coupled to said steering wheel and said steering gear,
   a pinion rotatively mounted on said first shaft,
   means for selectively coupling said pinion to said shaft,
   a second shaft displaced from said first shaft, said shaft having a detented position,
   a gear mounted on said second shaft intermediate its ends and said gear meshed with said pinion,
   a laver fixedly mounted at one end of said second shaft and extending laterally therefrom, said lever having an outwardly extending member from the free end, and
   a spring fixedly attached to said outwardly extending member and extending along said lever to a point diametrically opposite said outwardly extending member in the second shaft detented position, said spring acting to rotate said first shaft in the same rotational direction as the steering wheel.

5. The mechanism of claim 4 further comprising, restoring means coupled to said second shaft to restore said lever to its detented position when said steering wheel's direction of rotation is reversed.

6. The mechanism of claim 5 wherein the restoring means comprises:
   a pinion fixedly mounted to said second shaft,
   a rack operatively connected to said pinion, and
   a pair of opposed solenoids mounted at each end of said rack for pulling said rack and returning the second shaft to its detented position when said steering wheel's direction of rotation is reversed.

7. A mechanical steering assist mechanism comprising:

steering means extending from a steering wheel to the steered wheels, a shaft displaced from said steering means, said shaft operatively geared to said steering means, and said shaft having a detented position, an arm fixedly attached to and extending from one end of said shaft, said arm rotating in a direction which is determinative by said steering wheel, resilient means connected to the free end of said arm and extending in a direction so as to aid the rotation of said arm and thereby assisting in the rotation of the steering wheel, and restoring means for returning the shaft to its detented position when the rotational direction of the steering wheel is reversed.

8. The mechanism according to claim 7 wherein the resilient means is a variable rate tension spring wherein the spring rate increases as the spring length decreases.

9. The mechanism according to claim 7 wherein the restoring means comprises:

gear means fixedly mounted to said shaft, a rack operatively connected to said gear means, and a pair of opposed solenoids mounted at each end of said rack for pulling said rack and returning the shaft to its detented position when said steering wheel's direction of rotation is reversed.

10. The mechanism according to claim 7 wherein the resilient means is a spring extending from the free end of the arm to a point diametrically opposite the free end and the length of said spring equal to twice the length of said arm when said shaft is in its detented position.

References Cited
UNITED STATES PATENTS 2,311,321   2/1943   Zigan _____ 180—79.1
2,761,326   9/1956   Herbenar et al. _____ 180—79.1

BENJAMIN HERSH, Primary Examiner

JOHN A. PEKAR, Assistant Examiner